United States Patent
Hsieh et al.

(10) Patent No.: US 8,688,875 B2
(45) Date of Patent: Apr. 1, 2014

(54) HOST ELECTRONIC DEVICE AND HOST DETERMINATION METHOD

(71) Applicant: Acer Incorporated, Taipei Hsien (TW)

(72) Inventors: Fu-Yia Hsieh, Taipei Hsien (TW);
Ruei-Chuan Chang, Taipei Hsien (TW);
Ching-Yi Lin, Taipei Hsien (TW)

(73) Assignee: Acer Incorporated, Hsichih, Taipei Hsien (TW)

( * ) Notice: Subject to any disclaimer, the term of this patent is extended or adjusted under 35 U.S.C. 154(b) by 0 days.

(21) Appl. No.: 13/761,483

(22) Filed: Feb. 7, 2013

(65) Prior Publication Data
US 2013/0339557 A1    Dec. 19, 2013

(30) Foreign Application Priority Data
Jun. 19, 2012    (TW) .............................. 101121861 A

(51) Int. Cl.
*G06F 13/12*    (2006.01)
*G06F 13/20*    (2006.01)
(52) U.S. Cl.
USPC .......................................... 710/63; 710/313
(58) Field of Classification Search
None
See application file for complete search history.

(56) References Cited

U.S. PATENT DOCUMENTS

| | | | |
|---|---|---|---|
| 2005/0210167 A1* | 9/2005 | Kamphausen et al. | 710/62 |
| 2007/0016714 A1* | 1/2007 | Huotari et al. | 710/313 |
| 2009/0228627 A1* | 9/2009 | Huang et al. | 710/313 |
| 2010/0161759 A1* | 6/2010 | Brand | 709/218 |
| 2011/0138116 A1* | 6/2011 | Lipinski et al. | 711/103 |

* cited by examiner

*Primary Examiner* — Hyun Nam
(74) *Attorney, Agent, or Firm* — McClure, Qualey & Rodack, LLP

(57) ABSTRACT

The present disclosure provides a host electronic device including a main operating circuit, a first peripheral bus, an interface circuit, a second peripheral bus, and a conversion device. The interface circuit is coupled between the second peripheral bus and a host computer for receiving an external command form the host computer through a transmission protocol compatible with a first interface. The conversion device is coupled between the first and the second peripheral bus including an external virtual adapter, an internal virtual adapter, and a network channel. Furthermore, the conversion device encodes and decodes the external command, and produces a decoded external command. A processor of the main operating circuit executes the decoded external command, such that the main operating circuit implements a corresponding operation.

12 Claims, 7 Drawing Sheets

HOST ELECTRONIC DEVICE AND HOST DETERMINATION METHOD

CROSS REFERENCE TO RELATED APPLICATIONS

This application claims priority of Taiwan Patent Application No. 101121861, filed on Jun. 19, 2012, the entirety of which is incorporated by reference herein.

BACKGROUND OF THE INVENTION

1. Field of the Invention

The present disclosure relates to an electronic system, and in particular, relates to an electronic system with a high speed transmission interface.

2. Description of the Related Art

With vigorous development in the computer and communications industries, various new peripheral devices can now, be easily connected to personal computers (PCs), notebooks and so on. Peripheral devices include internet and external storage devices. The data of the peripheral devices is usually needed to be transmitted to a host computer, and the data of the host computer is usually needed to be transmitted to the peripheral devices. However, the transmission data speed is limited by the interface between the peripheral devices and the host computer. For example, the Network-attached storage (NAS) can only access the data of a host computer by network interface. Therefore, the highest data transmission speed between the NAS and the host computer is 1 Gbps.

Some of the current NASs can be connected with the personal computer by some other interfaces, such as a Universal Serial Bus interface (USB), such that the NASs can serve as an external storage device and the data transmission can speed up by the Universal Serial Bus interface. However the NASs cannot serve as the network storage for access by other devices when the NASs are connected to a personal computer by the Universal Serial Bus interface (USB).

It is therefore a desire to provide an electronic system and a performance control method to speed up the data transmission speed between the peripheral devices and the host computer, while maintaining network access of the peripheral devices and increase convenience in usage thereof.

BRIEF SUMMARY OF THE INVENTION

A detailed description is given in the following embodiments with reference to the accompanying drawings.

The present disclosure provides a host electronic device. The host electronic device includes a main operating circuit, a first peripheral bus, an interface circuit, a second peripheral bus and a conversion device. The main operating circuit has a processor. The first peripheral bus is arranged to be connected to the main operating circuit. The interface circuit is arranged to be coupled to a host computer, and receive an external command from the host computer by a transmission protocol compatible with a first interface. The second peripheral bus is arranged to be connected to the interface circuit. The conversion device is arranged to be coupled between the first peripheral bus and the second peripheral bus, wherein the conversion device further includes an external virtual adapter, an internal virtual adapter and a network channel. The external virtual adapter is arranged to be connected to the second peripheral bus and encode the external command to produce a first network packet. The internal virtual adapter is arranged to be connected to the first peripheral bus and receive the first network packet. The network channel is arranged to be coupled between the external virtual adapter and the internal virtual adapter and transmit the first network packet from the external virtual adapter to the internal virtual adapter, wherein the internal virtual adapter is further arranged to decode the first network packet received from the network channel to produce a decoded external command, and the processor is arranged to execute the decoded external command for enabling the main operating circuit to execute a corresponding operation.

Additionally, the present disclosure further provides a host determination method, applied to a host electronic device, wherein the host electronic device comprises a main operating circuit connected to a first peripheral bus and having a processor, a interface circuit connected to a second peripheral bus and compatible with a transmission protocol of a first interface, and a conversion device coupled between the first peripheral bus and the second peripheral bus. The host determination method comprises: receiving an external command from a host computer when the interface circuit is coupled to a third peripheral bus of the host computer; encoding the external command to produce a first network packet by an external virtual adapter of the conversion device; transmitting the first network packet to an internal virtual adapter through a network channel of the conversion device; decoding the first network packet to produce a decoded external command by the internal virtual adapter; and executing the decoded external command by the processor for enabling the main operating circuit to execute a corresponding operation.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
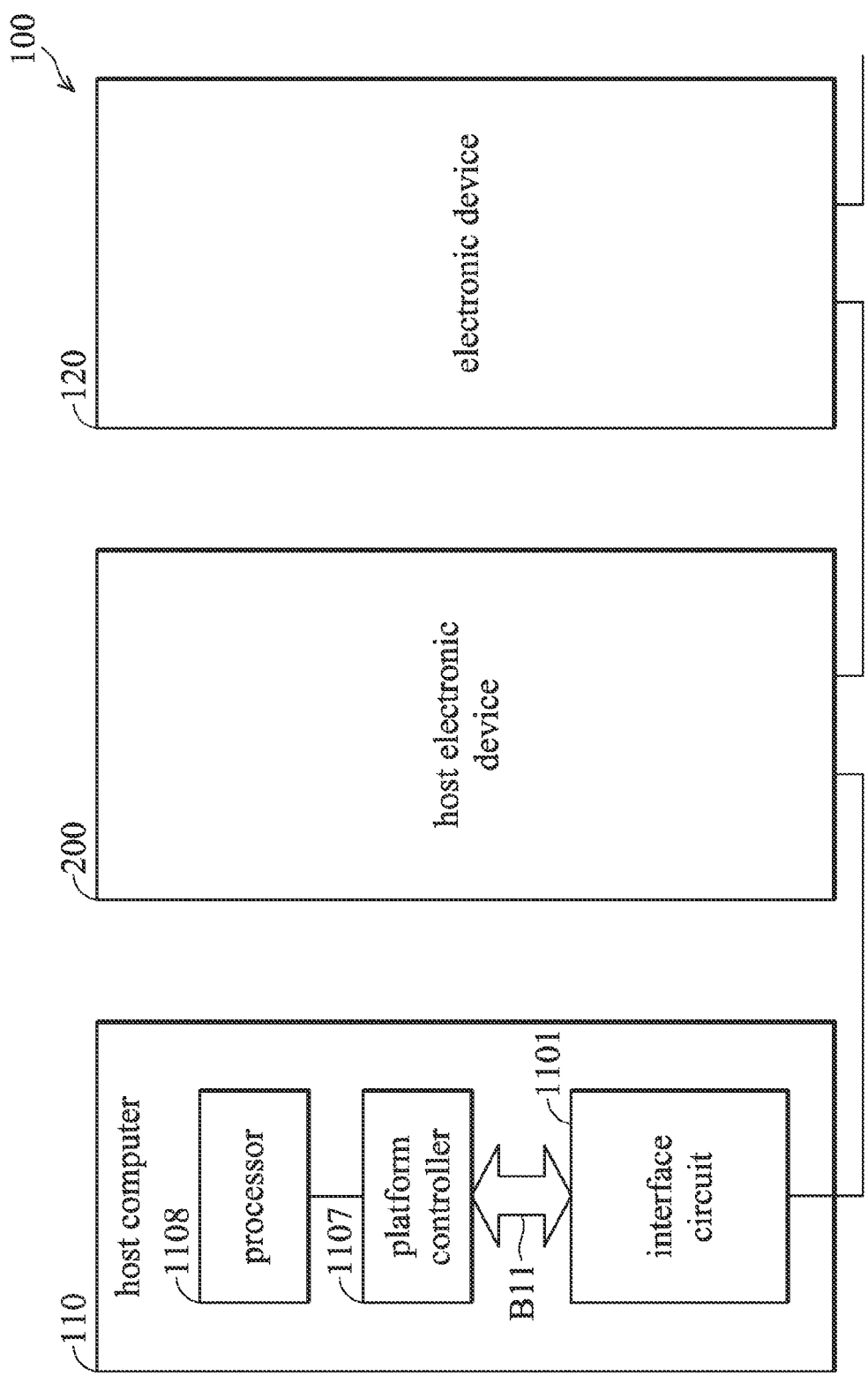
FIG. 1 is a schematic diagram illustrating an embodiment of an electronic system of the present invention.

FIG. 1 is a schematic diagram illustrating an embodiment of an electronic system of the disclosure. The electronic system 100 includes a host computer 110, at least one host electronic device 200 and at least one electronic device 120. It should be noted that, in some embodiments, the electronic device 120 and the host electronic device 200 are coupled in a daisy chain configuration, and the host electronic device 200 and the host computer 110 are coupled in a daisy chain configuration. Namely, the electronic device 120, the host electronic device 200 and the host computer 110 are coupled in a daisy chain configuration. In another embodiment, the host electronic device 200 is coupled to the host computer 110 by a wireless network rather than the daisy chain configuration. In the present embodiment, the host electronic device 200 can serve as a host terminal or a slave terminal. For example, in a first mode, the host electronic device 200 serves as a host terminal and is arranged to produce an internal command to operate the inner components of the host electronic device 200. On the contrary, in a second mode, the host electronic device 200 serves as a slave terminal and is arranged to receive the external command from the host computer 110. It should be noted that the host electronic device 200 may be any electronic device with a high speed interface, such as the thunderbolt interface or the universal serial bus (USB). Moreover, the host electronic device 200 can communicate with the electronic device 120 or the host computer 110 by the protocol of the thunderbolt interface or the universal serial bus. In some embodiments of the present invention, the electronic system 100 does not include the host computer 110.

The host computer 110 serves as a host terminal and is arranged to process data. Moreover, the host computer 110 is further arranged to transmit the external command to the host electronic device 200 and the electronic device 120 by a transmission protocol compatible with the thunderbolt interface or the universal serial bus interface. The host computer 110 includes an interface circuit 1101, a platform controller 1107 (also referred to as Platform Controller Hub, PCH), a processor 1108 and a peripheral bus B11. The interface circuit 1101 is arranged to be connected to the host electronic device 200 for communicating with the electronic device connected to the host computer 110 by a transmission protocol compatible with the thunderbolt interface or the universal serial bus, but the present disclosure is not limited thereto. The platform controller 1107 is arranged to be coupled between the interface circuit 1101 and the processor 1108 and is arranged to encode/decode data, such that the interface circuit 1101 and the processor 1108 can communicate with each other. The platform controller 1107 is further arranged to determine the sequence of program execution of the host computer 110, and transmit the commands of the processor 1108 to various components of the host computer 110, such as a storage device, wherein the platform controller 1107 is connected to the interface circuit 1101 by the peripheral bus B11. It should be noted that the host computer 110 can further include a storage device, a network module, a display device and/or a speaker (not shown), but, it is not limited thereto. For example, the host computer 110 may be a computer, a notebook or a tablet computer, but, it is not limited thereto. Moreover, the peripheral bus B11 may be a peripheral component interconnect bus (PCI) or a universal serial bus (USB).

In the present disclosure, the interface between the host electronic device 200, the host computer 110 and the electronic device 120 is thunderbolt interface or universal serial bus, but, it is not limited thereto. For example, any interface with high data transmission speed (more than 5 Gbps) can be the interface between the host electronic device 200, the host computer 110 and the electronic device 120. It should be noted that the thunderbolt interface of the present embodiment includes a peripheral component interconnect express interface (PCIE) and a DisplayPort interface (DP), but, it is not limited thereto. Moreover, the peripheral component interconnect express interface of the thunderbolt interface of the present embodiment only allows one host terminal to exist. Therefore, there can't be more than one host terminal on the channel coupled between the host computer 110, the host electronic device 200 and the electronic device 120. Similarly, the universal serial bus interface only allows one host terminal to exist, and there can't be more than one host terminal on the channel coupled between the host computer 110, the host electronic device 200 and the electronic device 120.

Figure 2:
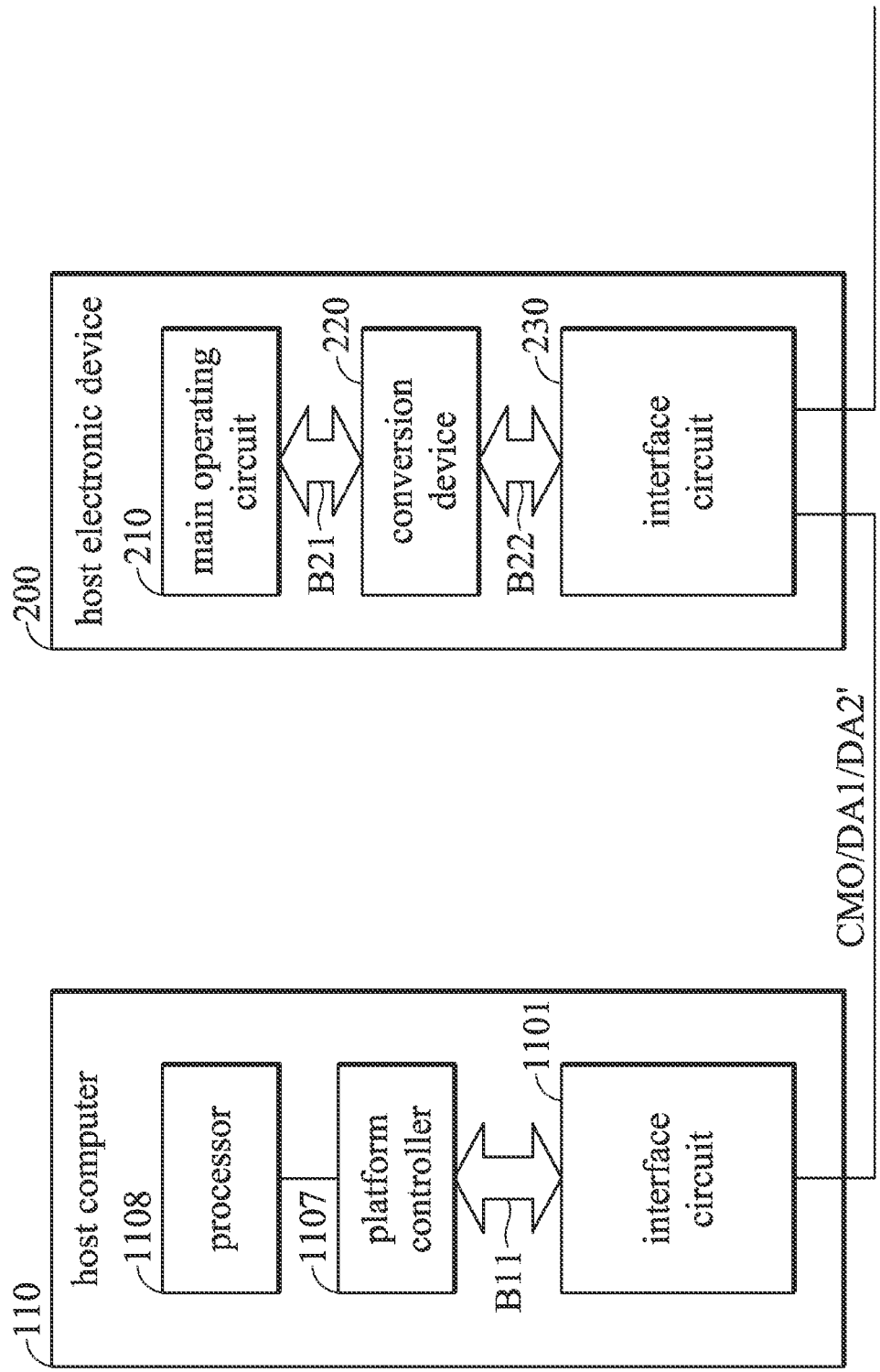
FIG. 2 is a schematic diagram illustrating an embodiment of a host electronic device and a host computer of the present invention.

FIG. 2 is a schematic diagram illustrating an embodiment of a host electronic device and a host computer of the present invention. The host electronic device 200 includes a main operating circuit 210, a conversion device 220, an interface circuit 230, a peripheral bus B21 and a peripheral bus B22. In a preferred embodiment of the present invention, the main operating circuit 210 is a Network-attached storage (NAS) arranged to store data from networks, and provide access by other devices to the stored data through the networks. The conversion device 220 is arranged to be coupled between the peripheral bus B21 and the peripheral bus B22 and receive an external command CMO of the host computer 110 from the interface circuit 230. The conversion device 220 is further arranged to encode and decode the external command CMO to produce a decoded external command and transmit the decoded external command to the main operating circuit 210. The interface circuit 230 is arranged so that it is coupled to the interface circuit 1101 of the host computer 110 and receives the external command CMO and/or the data DA1 from the host computer 110 by a transmission protocol compatible with a first interface. In another embodiment of the present invention, the interface circuit 230 is further arranged to transmit the data DA2' of the main operating circuit 210 to the host computer 110 by the transmission protocol compatible with the first interface. The peripheral bus B21 is arranged to connect the main operating circuit 210 with the conversion device 220. The peripheral bus B22 is arranged to connect the conversion device 220 with the interface circuit 230. It should be noted that the first interface may be the thunderbolt interface or the universal serial bus interface, and the peripheral bus B21 and the peripheral bus B22 may be the peripheral component interconnect bus or the universal serial bus (USB).

Figure 3:
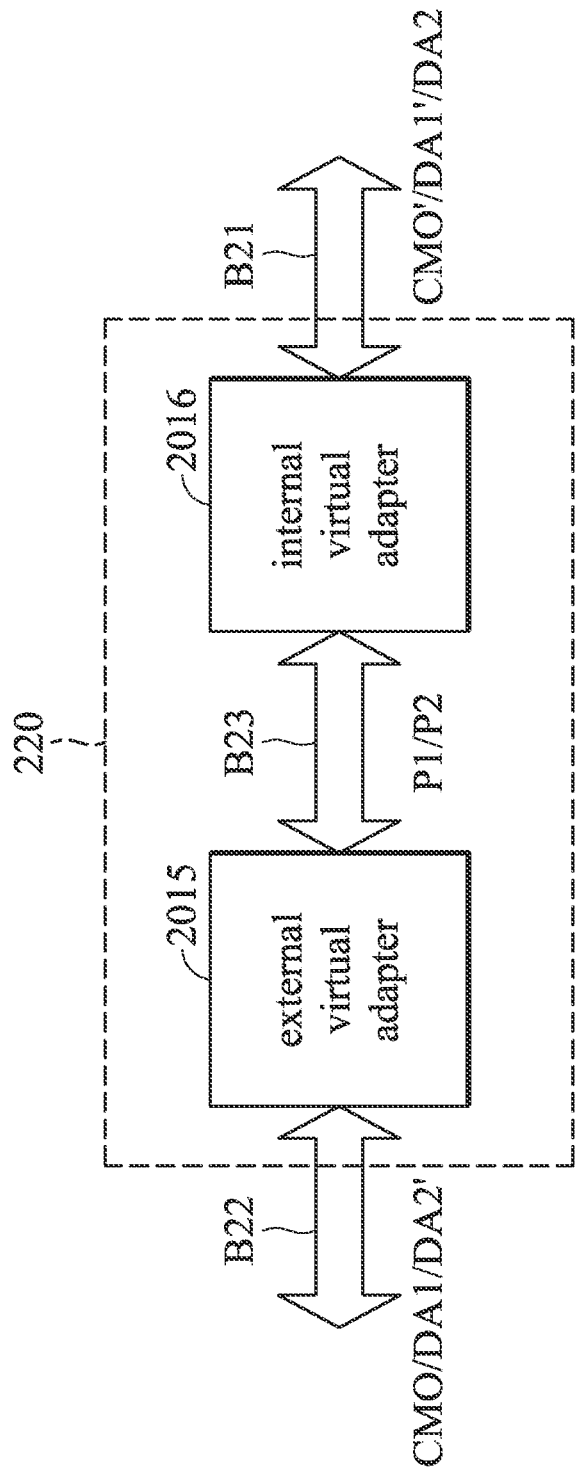
FIG. 3 is a schematic diagram illustrating an embodiment of a conversion device of the present invention.

FIG. 3 is a schematic diagram illustrating an embodiment of a conversion device of the present invention. The conversion device 220 includes an external virtual adapter 2015, an internal virtual adapter 2016 and at least one network channel B23. The external virtual adapter 2015 is arranged to be connected to the peripheral bus B22 and the network channel B23, wherein the external virtual adapter 2015 is further arranged to receive the external command CMO and/or the data DA1 through the peripheral bus B22, and encode the external command CMO and/or the data DA1 to produce a network packet P1. Moreover, the external virtual adapter 2015 is further arranged to transmit the network packet P1 to the internal virtual adapter 2016 through the network channel B23. The internal virtual adapter 2016 is arranged to connect to the peripheral bus B21 and the network channel B23, wherein the internal virtual adapter 2016 is further arranged to receive the network packet P1 through the network channel B23 and decode the network packet P1 to produce a decoded external command CMO' and/or data DA1'. Moreover, the internal virtual adapter 2016 is further arranged to transmit the decoded external command CMO' and/or the data DA1' to the main operating circuit 210 through the peripheral bus B21. In another embodiment of the present invention, the internal virtual adapter 2016 is further arranged to encode the data DA2 of the main operating circuit 210 to produce a network packet P2, and transmit the network packet P2 to the external virtual adapter 2015 by the network channel B23.

The external virtual adapter 2015 is arranged to decode the network packet P2 to produce data DA2' after receiving the network packet P2 from the internal virtual adapter 2016 and transmit the data DA2' to the host computer 110. The network channel B23 is arranged to be coupled between the external virtual adapter 2015 and the internal virtual adapter 2016, and transmit the network packet P1 from the external virtual adapter 2015 to the internal virtual adapter 2016. The internal virtual adapter 2016 decodes the network packet P1 to produce a decoded external command CMO' after receiving the network packet P1 from the network channel B23. The network channel B23 is further arranged to transmit the network packet P2 from the internal virtual adapter 2016 to the external virtual adapter 2015. The external virtual adapter 2015 decodes the network packet P2 to produce the data DA2' after receiving the network packet P2 from the network channel B23. Moreover, the conversion device 220 further includes a driver program DR. The driver program DR is arranged to produce virtual hardware information when the interface circuit 230 is coupled to a peripheral bus B11 of the host computer 110, and transmit the virtual hardware information to the host computer 110 for enabling the host computer 110 to identify the host electronic device 200 as a peripheral device, wherein the virtual hardware information is arranged for enabling the host computer 110 to identify the host electronic device 200 as a network disk drive or an external disk drive. For example, the driver program DR transmits the virtual hardware information to the host computer 110 when the host electronic device 200 is coupled to the host computer 110, such that the host computer 110 identifies the host electronic device 200 as a specific hardware device. In the present disclosure, the specific hardware device may be a network disk drive or an external disk drive, but, it is not limited thereto. The host electronic device 200 is displayed as a common hardware device on the host computer 110, such like displaying the icon representing the host electronic device 200 when the host computer 110 identifies the host electronic device 200 as a disk drive. In another embodiment of the present invention, the driver program DR enables the host computer 110 to identify the host electronic device 200 as a network disk drive when the host electronic device 200 is coupled to the host computer 110. For example, the host electronic device 200 is displayed as a network disk drive on the host computer 110 when the host computer 110 identifies the host electronic device 200 as a network disk drive. It should be noted that the driver program DR may be implemented in the internal virtual adapter 2016, but, it is not limited thereto.

Figure 4:
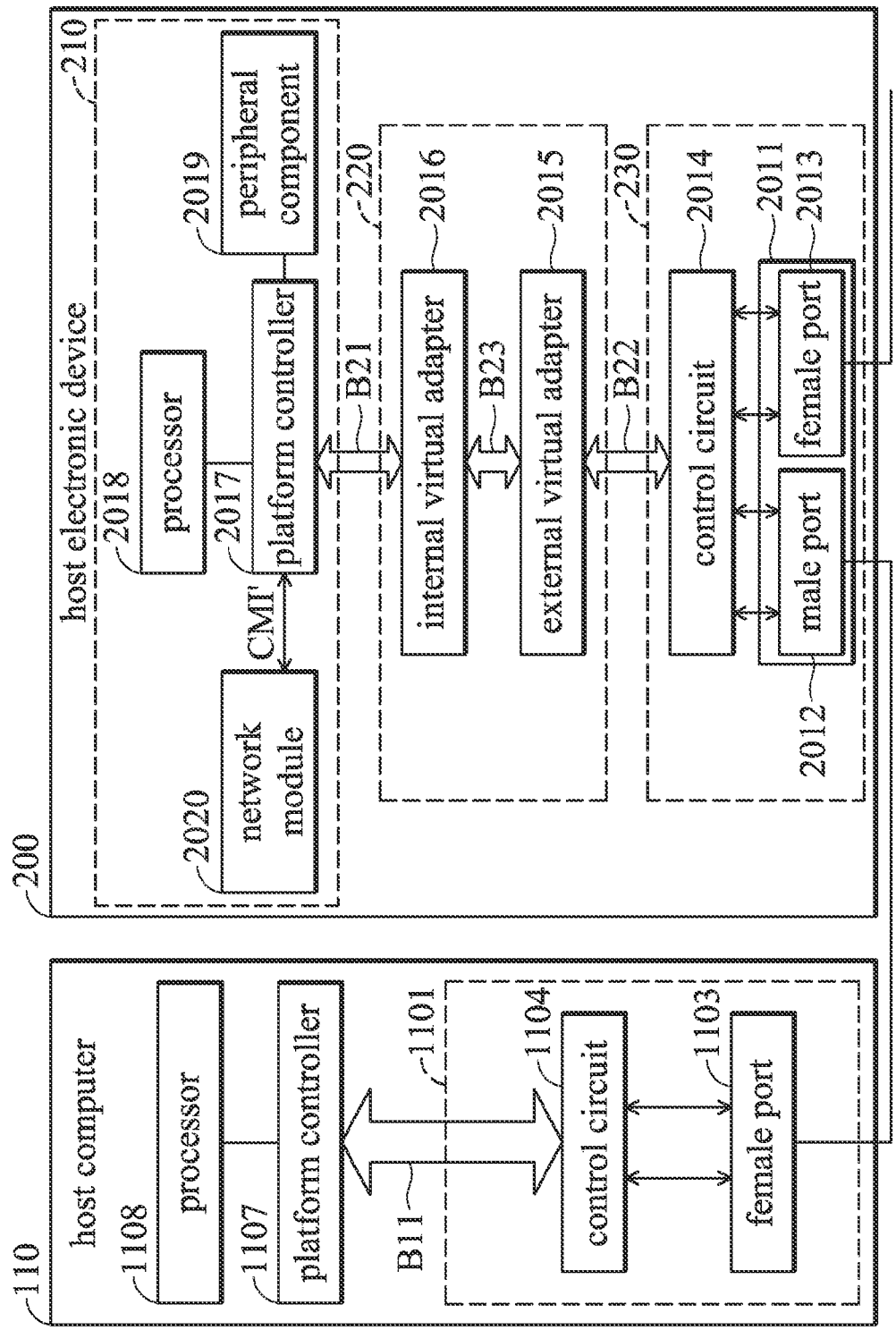
FIG. 4 is a schematic diagram illustrating another embodiment of the host electronic device and the host computer of the present invention.

FIG. 4 is a schematic diagram illustrating another embodiment of the host electronic device and the host computer of the present invention. It should be noted that the first interface of this embodiment is the thunderbolt interface, and each of the peripheral bus B11, the peripheral bus B21 and the peripheral bus B22 is the peripheral component interconnect bus. The host computer 110 includes the processor 1108, the platform controller 1107 and the interface circuit 1101. Reference may be made to FIG. 1 for the descriptions of the features of the processor 1108 and the platform controller 1107. It should be noted that, in the present embodiment, the interface circuit 1101 further includes a female port 1103 and a control circuit 1104. The female port 1103 is arranged to be connected to the male port, such as the male port 2012, of the host electronic device 200 or the electronic device 120. Therefore, the female port 1103 can communicate with the electronic device 120 or the host electronic device 200 connected with the host computer 110 by the transmission protocol compatible with the thunderbolt interface, but, it is not limited thereto. In some embodiments, the female port 1103 of the host computer 110 can be replaced by a male port to be connected to the female port of the host electronic device 200 or the electronic device 120. The control circuit 1104 is arranged to transmit the external command CMO and/or the data DA1 to the host electronic device 200 and/or the electronic device 120 by the transmission protocol compatible with the thunderbolt interface when the host computer 110 is coupled to the host electronic device 200 and/or the electronic device 120. In another embodiment, the control circuit 1104 is further arranged to receive the data, such as the data DA2', from the host electronic device 200 and/or the electronic device 120 by the transmission protocol compatible with the universal serial bus when the host computer 110 is coupled to the host electronic device 200 and/or the electronic device 120.

The host electronic device 200 includes a main operating circuit 210, a conversion device 220, an interface circuit 230, a peripheral bus B21 and a peripheral bus B22. Reference may be made to FIG. 2 and FIG. 3 for descriptions of the features of the host electronic device 200. In this embodiment, the main operating circuit 210 further includes the platform controller 2017, the processor 2018, the peripheral component 2019 and the network module 2020. The platform controller 2017 is arranged to be coupled between the conversion device 220, the processor 2018, the peripheral component 2019 and the network module 2020. The platform controller 2017 is arranged to encode/decode data, such that the conversion device 220, the network module 2020 and the processor 2018 can communicate with each other. The platform controller 2017 is further arranged to determine the sequence of program execution of the host electronic device 200, and transmit the command, such as the internal command CMI, executed by the processor 2018 to the peripheral component 2019. It should be noted that the platform controller 2017 transmits the decoded external command CMO' to the processor 2018 after receiving the decoded external command CMO' from the internal virtual adapter 2016. The processor 2018 executes the decoded external command CMO' for enabling the main operating circuit 210 to execute a corresponding operation, wherein the processor 2018 transmits the command produced by executing the decoded external command CMO' to the peripheral component 2019 through the platform controller 2017. The peripheral component 2019 may be a display, a speaker or other device, but, it is not limited thereto. In a preferred embodiment of the present invention, the main operating circuit 210 may be a Network-attached storage (NAS), and the peripheral component 2019 may be a storage device. The network module 2020 is arranged to receive a network packet through a wireless or wired network, and decode the network packet to produce an internal command CM1'. Moreover, the network module 2020 is further arranged to transmit the internal command CM1' to the processor 2018 through the platform controller 2017. The processor 2018 executes the internal command CM1' for enabling the main operating circuit 210 to execute a corresponding operation. In this embodiment, the interface circuit 230 further includes a transmission port circuit 2011 and a control circuit 2014. The transmission port circuit 2011 is arranged to be connected to the electronic device 120 and/or the host computer 110. For example, the transmission port circuit 2011 includes a male port 2012 and a female port 2013. The male port 2012 is arranged to be connected to the female port of the host computer 110 or the electronic device 120, and the female port 2013 is arranged to be connected to the male port of the electronic device 120 or the host computer 110, such that the transmission port circuit 2011 can communicate with the host computer 110 and/or the electronic device 120 connected with the host electronic device 200 by the transmission protocol compatible with the thunderbolt interface. In some of the embodiments, the transmission port circuit 2011 includes two male ports 2012 or two female ports 2013. The control circuit 2014 is arranged to receive the external command CMO and/or the data DA1 from the host computer 110 by the transmission protocol compatible with the thunderbolt interface when the host electronic device 200 is coupled to the host computer 110. The control circuit 2014 transmits the external command CMO and/or the data DA1 to the external virtual adapter 2015 after receiving the external command CMO and/or the data DA1. Moreover, the control circuit 2014 further transmits the data DA2' to the host computer 110 according to the external command CMO by the transmission protocol compatible with the thunderbolt interface. It should be noted that the content of the decoded external command CMO' and the external command CMO are the same, the content of the data DA1' and the data DA1 are the same, and the content of the data DA2' and the data DA2 are the same.

Figure 5:
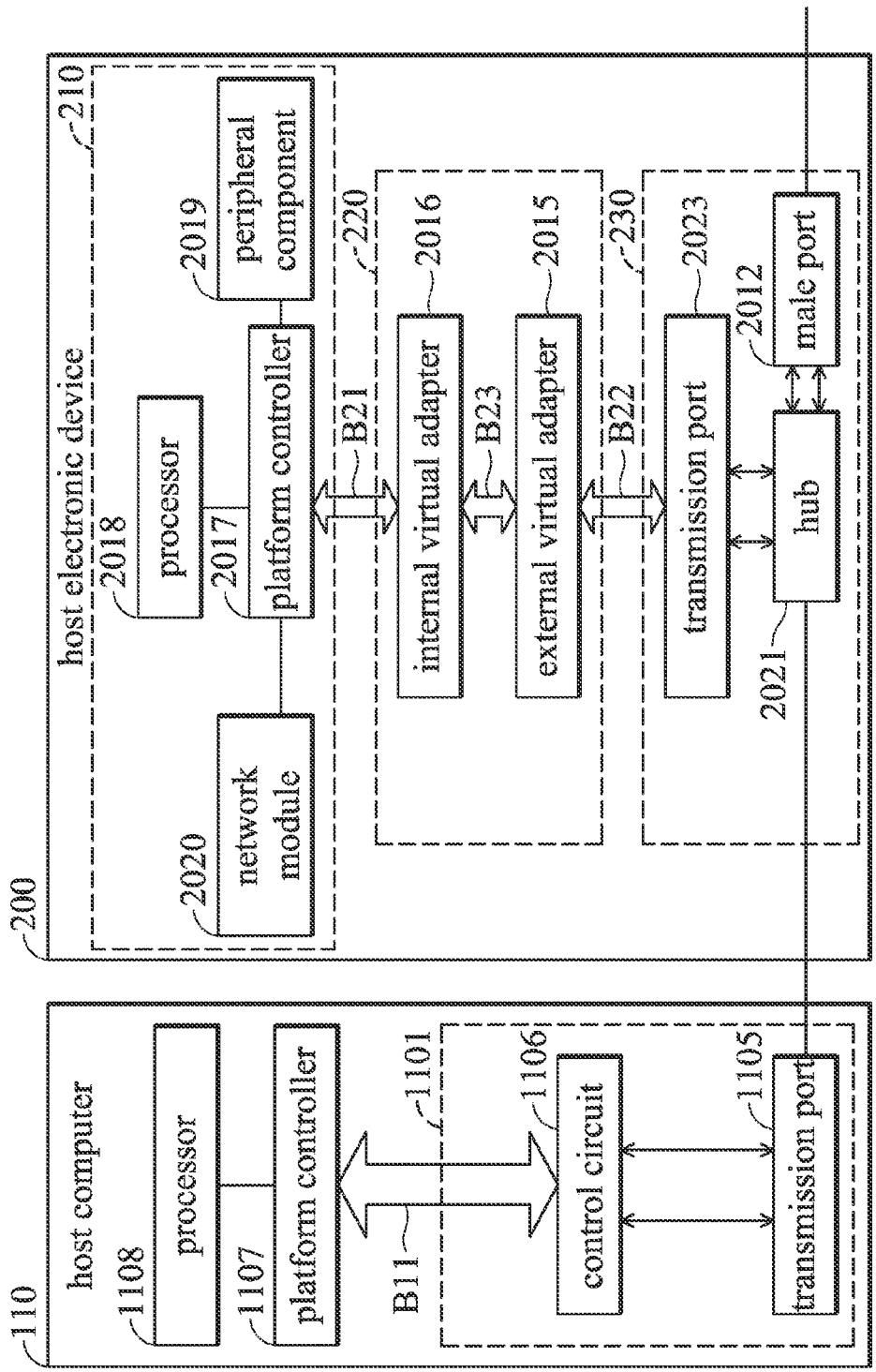
FIG. 5 is a schematic diagram illustrating another embodiment of the host electronic device and the host computer of the present invention.

FIG. 5 is a schematic diagram illustrating another embodiment of the host electronic device and the host computer of the present invention. It should be noted that the first interface of this embodiment is the universal serial bus interface, and each of the peripheral bus B11, the peripheral bus B21 and the peripheral bus B22 is the universal serial bus. The host computer 110 includes the processor 1108, the platform controller 1107 and the interface circuit 1101. Reference may be made to FIG. 1 for descriptions of the features of the processor 1108 and the platform controller 1107. It should be noted that the interface circuit 1101 of this embodiment further includes a transmission port 1105 and a control circuit 1106. The transmission port 1105 is arranged to be connected to the hub, such as the hub 2021, of the host electronic device 200 or the electronic device 120, such that the transmission port 1105 can communicate with the host electronic device 200 and/or the electronic device 120 connected with the host computer 110 by the transmission protocol compatible with the universal serial bus interface, but, it is not limited thereto. The control circuit 1106 is arranged to transmit the external command CMO and/or the data DA1 by the transmission protocol compatible with the universal serial bus interface to the host electronic device 200 and/or the electronic device 120 when the host computer 110 is coupled to the host electronic device 200 and/or the electronic device 120. In another embodiment, the control circuit 1106 is further arranged to receive the data, such as the data DA2', of the host electronic device 200 and/or the electronic device 120 when the host computer 110 is coupled to the host electronic device 200 and/or the electronic device 120 by the transmission protocol compatible with the universal serial bus interface.

The host electronic device 200 includes a main operating circuit 210, a conversion device 220, an interface circuit 230, a peripheral bus B21 and a peripheral bus B22. Reference may be made to FIG. 2 and FIG. 3 for the descriptions and features of the host electronic device 200. In this embodiment, the main operating circuit 210 further includes the platform controller 2017, the processor 2018, the peripheral component 2019 and the network module 2020. The platform controller 2017 is arranged to be coupled between the conversion device 220, the processor 2018, the peripheral component 2019 and the network module 2020. The platform controller 2017 is arranged to decode/encode data, such that the conversion device 220, the network module 2020 and the processor 2018 can communicate with each other. The platform controller 2017 is further arranged to determine the sequence of program execution of the host electronic device 200, and transmit the command, such as the internal command CMI, of the processor 2018 to the peripheral component 2019. It should be noted that the platform controller 2017 transmits the decoded external command CMO' to the processor 2018 after receiving the decoded external command CMO' from the internal virtual adapter 2016. The processor 2018 executes the decoded external command CMO' for enabling the main operating circuit 210 to execute a corresponding operation, wherein the processor 2018 is arranged to transmit the command produced by executing the decoded external command CMO' by the processor 2018 to the peripheral component 2019 through the platform controller 2017. The peripheral component 2019 may be a display, a speaker or other device, but, it is not limited thereto. In a preferred embodiment of the present invention, the main operating circuit 210 may be a Network-attached storage (NAS), and the peripheral component 2019 may be a storage device. The network module 2020 is arranged to receive a network packet through a wireless or a wired network, and decode the network packet to produce an internal command CMI'. Moreover, the network module 2020 is further arranged to transmit the internal command CMI' to the processor 2018 through the platform controller 2017. The processor 2018 executes the internal command CMI' for enabling the main operating circuit 210 to execute a corresponding operation. In this embodiment, the interface circuit 230 further includes a hub 2021, a transmission port 2022 and a transmission port 2023. The hub 2021 is arranged to be connected to the electronic device 120 and/or the transmission port of host computer 110, such as the transmission port 1105, such that the hub 2021 can communicate with the host computer 110 and/or the electronic device 120 connected with the host electronic device 200 by the transmission protocol compatible with the universal serial bus interface. The transmission port 2022 is arranged to be connected to the hub 2021 and the hub (not shown) of the electronic device 120. The transmission port 2022 is arranged to communicate with the electronic device 120 connected with the host electronic device 200 by the transmission protocol compatible with the universal serial bus. The transmission port 2023 is arranged to be connected between the hub 2021 and the peripheral bus B22, such that the transmission port 2023 can transmit data to the host computer 110 or the electronic device 120 connected with the host electronic device 200 through the hub 2021, or transmit data to the external virtual adapter 2015 through the peripheral bus B22 by the transmission protocol compatible with the universal serial bus interface.

Figure 6A:
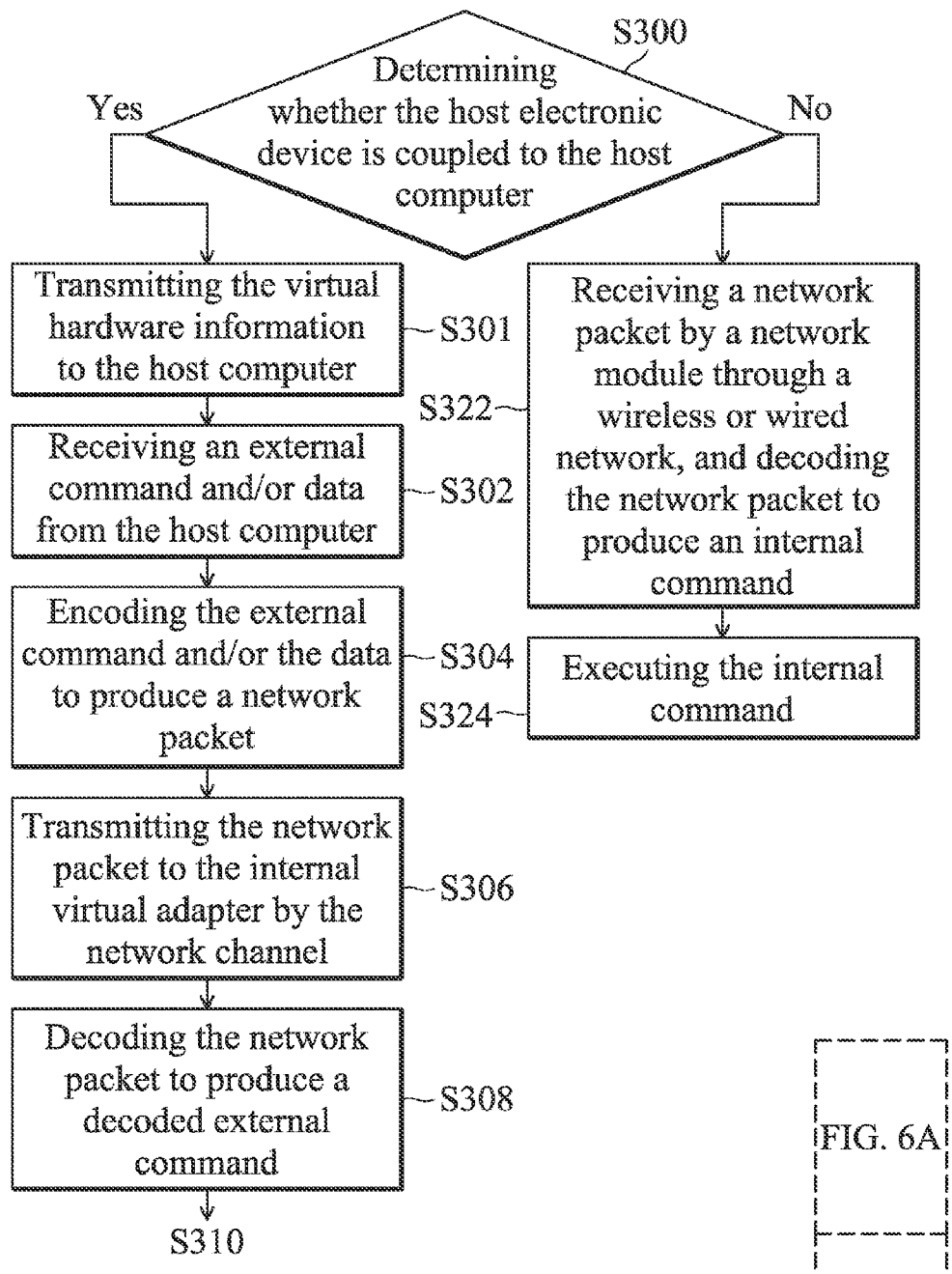
FIGS. 6A and 6B are flowcharts of a host determination method according to an embodiment of the present invention.
Figure 6B:
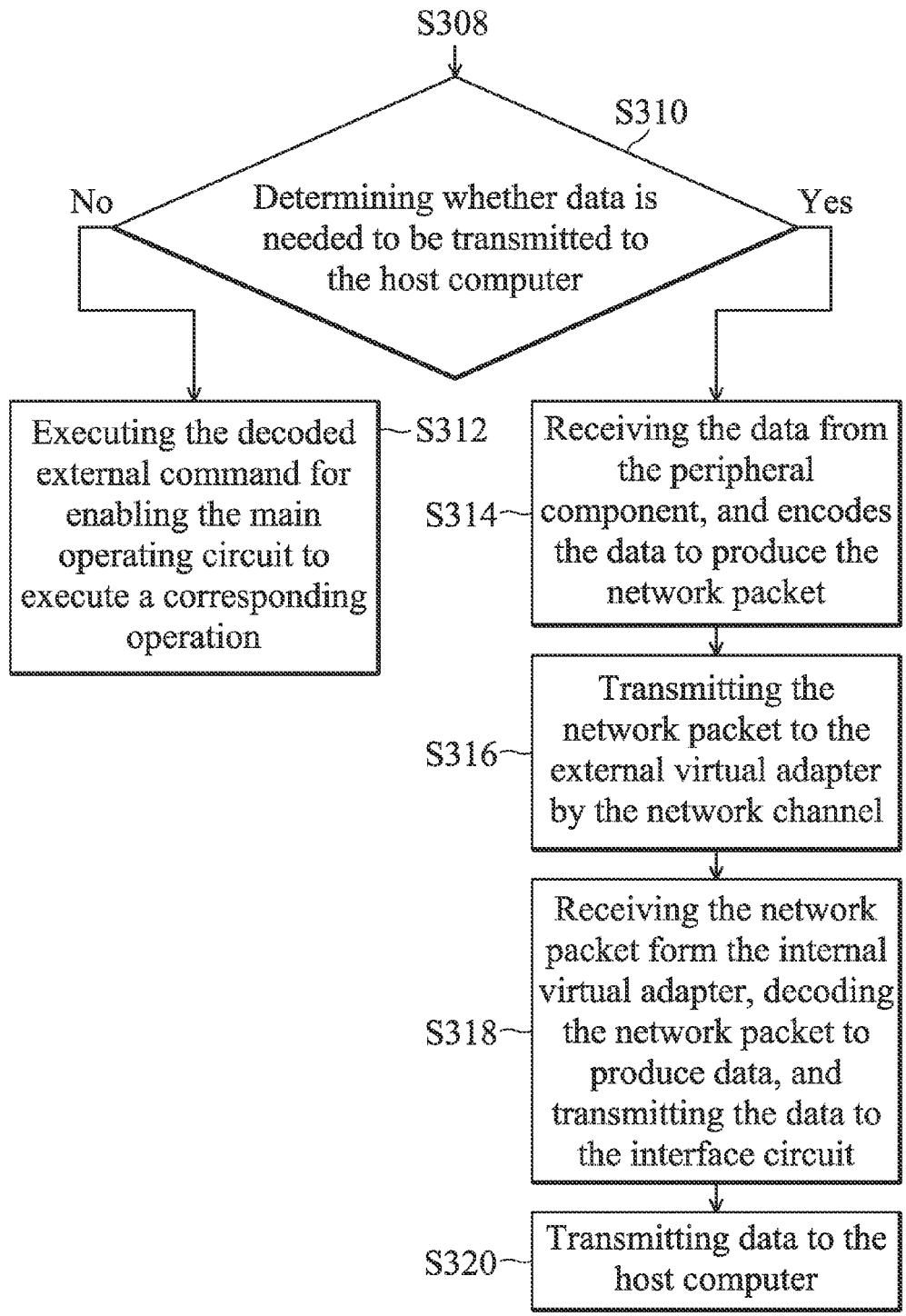

FIGS. 6A and 6B are flowcharts of a host determination method according to an embodiment of the present invention. The host determination method is applied to the host electronic device 200, wherein the host electronic device 200 includes the main operating circuit 210 having the processor 2018 and connected to the peripheral bus B21, the interface circuit 230 compatible with the transmission protocol compatible with the first interface and connected to the peripheral bus B22, and the conversion device 220 coupled between the peripheral bus B21 and the peripheral bus B22. It should be noted that first interface is the thunderbolt interface or the universal serial bus interface, and the peripheral bus B21 and the peripheral bus B22 are the peripheral component interconnect buses. As shown in FIG. 1, the host electronic device 200 and at least one electronic device 120 and/or a host computer 110 are coupled in a daisy chain configuration. The process starts at step S300.

In step S300, the control circuit 2014 or the hub 2021 of the interface circuit 230 determines whether the host electronic device 200 is coupled to the host computer 110. When the host electronic device 200 is coupled to the host computer 110, the process goes to step S301. When the host electronic device 200 is not coupled to the host computer 110, the process goes to step S322.

In step S301, the interface circuit 230 transmits the virtual hardware information produced by the driver program DR of the conversion device 220 to the host computer 110, wherein the virtual hardware information is arranged for enabling the host computer 110 to identify the host electronic device 200 as a network disk drive or an external disk drive. For example, the host electronic device 200 is displayed as a common hardware device on the host computer 110, such like displaying the icon representing the host electronic device 200, when the host computer 110 identifies the host electronic device 200 as an external disk drive. For another example, the host electronic device 200 is displayed as a network disk drive on the host computer 110 when the host computer 110 identifies the host electronic device 200 as a network disk drive.

Next, in step S302, the interface circuit 230 receives an external command CMO and/or data DA1 from the host computer 110 by the transmission protocol compatible with the thunderbolt interface or the universal serial bus interface.

Next, in step S304, the external virtual adapter 2015 encodes the external command CMO and/or the data DA1 to produce a network packet P1.

Next, in step S306, the external virtual adapter 2015 transmits the network packet P1 to the internal virtual adapter 2016 by the network channel B23.

Next, in step S308, the internal virtual adapter 2016 decodes the network packet P1 to produce a decoded external command CMO', and transmits the decoded external command CMO' to the processor 2018 through the platform controller 2017. Next, the process goes to step S310. In another embodiment of the present invention, the internal virtual adapter 2016 is further arranged to decode the network packet P1 to produce data DA1', and transmit the data DA1' to the main operating circuit 210. The process ends at step S308.

Next, in step S310, the processor 2018 determines whether the decoded external command CMO' indicates that the data is needed to be transmitted to the host computer 110. When the decoded external command CMO' does not indicate that data is needed to be transmitted to the host computer 110, the process goes to step S312. When the decoded external command CMO' indicates that data is needed to be transmitted to the host computer 110, the process goes to step S314.

In step S312, the processor 2018 executes the decoded external command CMO' for enabling the main operating circuit 210 to execute a corresponding operation. The process ends at step S312.

In step S314, the internal virtual adapter 2016 receives the data DA2 from the peripheral component 2019, and encodes the data DA2 to produce the network packet P2.

Next, in step S316, the internal virtual adapter 2016 transmits the network packet P2 to the external virtual adapter 2015 by the network channel B23.

Next, in step S318, the external virtual adapter 2015 receives the network packet P2 from the internal virtual adapter 2016, decodes the network packet P2 to produce data DA2', and transmits the data DA2' to the interface circuit 230.

Next, in step S320, the interface circuit 230 transmits data DA2' to the host computer 110 by the transmission protocol compatible with the thunderbolt interface or the universal serial bus interface. The process ends at step S320.

In step S322, the main operating circuit 210 receives a network packet by a network module 2020 through a wireless or wired network, and decodes the network packet to produce an internal command CMI'.

Next, in step S324, the processor 2018 executes the internal command CMI' for enabling the main operating circuit 210 to execute a corresponding operation. The process ends at step S324.

It should be noted that the host electronic device of the present invention is capable of operating in two modes. Namely, the host electronic device of the present invention can receive network packets by a network module to access data of a network, and receive the packets of host computers by the transmission port to access the data of host computers. Therefore, the data of the host electronic device of the present invention can be accessed by the other electronic device through the network when the host electronic device is connected to the host computer. Furthermore, the data of the host electronic device of the present invention can be accessed by the host computer through a high speed interface rather than the network when the host electronic device is connected to the host computer.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A host electronic device, comprising:
    a main operating circuit, having a processor;
    a first peripheral bus, arranged to be connected to the main operating circuit;
    an interface circuit, arranged to be coupled to a host computer, and receive an external command from the host computer by a transmission protocol compatible with a first interface;
    a second peripheral bus, arranged to be connected to the interface circuit; and
    a conversion device, arranged to be coupled between the first peripheral bus and the second peripheral bus, wherein the conversion device further comprises:
        an external virtual adapter, arranged to be connected to the second peripheral bus, and encode the external command to produce a first network packet;
        an internal virtual adapter, arranged to be connected to the first peripheral bus, and receive the first network packet; and
        a network channel, arranged to be coupled between the external virtual adapter and the internal virtual adapter, and transmit the first network packet from the external virtual adapter to the internal virtual adapter, wherein the internal virtual adapter is further arranged to decode the first network packet received from the network channel to produce a decoded external command, and the processor is arranged to execute the decoded external command for enabling the main operating circuit to execute a corresponding operation.

2. The host electronic device as claimed in claim 1, wherein the internal virtual adapter is further arranged to encode a first data of the main operating circuit to produce a second network packet and transmit the second network packet to the external virtual adapter by the network channel, and the external virtual adapter is further arranged to decode the second network packet received from the network channel to produce a second data and transmit the second data to the host computer.

3. The host electronic device as claimed in claim 1, wherein the external virtual adapter is further arranged to encode a first data of the host computer to produce a second network packet and transmit the second network packet to the internal virtual adapter by the network channel, and the internal virtual adapter is further arranged to decode the second network packet received from the network channel to produce a second data and transmit the second data to the main operating circuit.

4. The host electronic device as claimed in claim 1, wherein the conversion device further produces a virtual hardware information and transmits the virtual hardware information to the host computer for enabling the host computer to identify the host electronic device as a peripheral device when the interface circuit is coupled to a third peripheral bus of the host computer.

5. The host electronic device as claimed in claim 1, wherein the main operating circuit further comprises a network module arranged to receive a second network packet and decode the second network packet to produce an internal command, wherein the processor is arranged to execute the internal command for enabling the main operating circuit to execute a corresponding operation.

6. The host electronic device as claimed in claim 1, wherein the first interface is a thunderbolt interface, and each of the first, second and third peripheral buses is a peripheral component interconnect bus.

7. The host electronic device as claimed in claim 1, wherein the first interface is a universal serial bus interface, and each of the first, second, third peripheral buses is a universal serial bus.

8. A host determination method, applied to a host electronic device, wherein the host electronic device comprises a main operating circuit connected to a first peripheral bus and having a processor, an interface circuit connected to a second peripheral bus and compatible with a transmission protocol of a first interface, and a conversion device coupled between the first peripheral bus and the second peripheral bus, the host determination method comprising:
receiving an external command from a host computer when the interface circuit is coupled to a third peripheral bus of the host computer;
encoding the external command to produce a first network packet by an external virtual adapter of the conversion device;
transmitting the first network packet to an internal virtual adapter by a network channel of the conversion device;
decoding the first network packet to produce a decoded external command by the internal virtual adapter; and
executing the decoded external command by the processor for enabling the main operating circuit to execute a corresponding operation.

9. The host determination method as claimed in claim 8, further comprising:
encoding a first data to produce a second network packet by the internal virtual adapter;
transmitting the second network packet to the external virtual adapter by the network channel;
decoding the second network packet to produce a second data by the external virtual adapter; and
transmitting the second data to the host computer.

10. The host determination method as claimed in claim 8, further comprising:
encoding a first data to produce a second network packet by the external virtual adapter;
transmitting the second network packet to the internal virtual adapter by the network channel;
decoding the second network packet to produce a second data by the internal virtual adapter; and
transmitting the second data to the main operating circuit.

11. The host determination method as claimed in claim 8, further comprising transmitting a virtual hardware information produced by the conversion device to the host computer when the interface circuit is coupled to the third peripheral bus.

12. The host determination method as claimed in claim 8, further comprising:
receiving a second network packet and decoding the second network packet to produce an internal command by a network module; and
executing the internal command for enabling the main operating circuit to execute a corresponding operation by the processor.

* * * * *